(12) United States Patent
Forsythe et al.

(10) Patent No.: US 6,745,050 B1
(45) Date of Patent: Jun. 1, 2004

(54) MULTICHANNEL MULTIUSER DETECTION

(75) Inventors: Keith W. Forsythe, Lexington, MA (US); Daniel W. Bliss, Woburn, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 475 days.

(21) Appl. No.: 09/783,723

(22) Filed: Feb. 14, 2001

Related U.S. Application Data

(60) Provisional application No. 60/242,548, filed on Oct. 23, 2000.

(51) Int. Cl.[7] .................................................. H04B 1/38
(52) U.S. Cl. ..................... 455/561; 455/562.1; 370/342
(58) Field of Search ............................. 455/561, 562.1, 455/272, 273, 277.1, 277.2, 278.1, 63.1; 370/310, 342; 375/130, 140

(56) References Cited

U.S. PATENT DOCUMENTS

| | | | | |
|---|---|---|---|---|
| RE31,943 E | * | 7/1985 | Ready ...................... | 455/226.1 |
| 4,794,556 A | | 12/1988 | Rader ..................... | 364/724.17 |
| 4,941,178 A | | 7/1990 | Chuang ....................... | 381/41 |
| 5,668,830 A | * | 9/1997 | Georgiou et al. ........... | 375/220 |
| 6,480,557 B1 | * | 11/2002 | Rog et al. .................... | 375/349 |
| 2002/0097779 A1 | * | 7/2002 | Bang et al. ................. | 375/144 |

OTHER PUBLICATIONS

Forsythe, K. et al., "Multichannel Adaptive Beamforming and Interference Mitigation in Multiuser DCMA Systems," Conference Proceedings for 7th Annual ASAP (Adaptive Sensor Array Processing) Workshop (ASAP '99), MIT Lincoln Laboratory, pp. 506–510 (1999).

* cited by examiner

*Primary Examiner*—Nay Maung
*Assistant Examiner*—Tan Trinh
(74) *Attorney, Agent, or Firm*—Hamilton, Brook, Smith & Reynolds, P.C.

(57) ABSTRACT

For multichannel multiuser detection in a wireless communication system such as a CDMA system, for a set of user spreading codes, coefficients to delay lines are adjusted and the delay line output processed to estimate a symbol. The symbol is estimated based on a space-time correlation for an antenna space delay time correlation. The estimated symbol is then remodulated and subtracted from the received antenna signal corresponding to other users of the wireless communication system. The adjusting and processing are iterated until the estimated symbols converge such that they correspond to a predetermined symbol decision criteria.

32 Claims, 19 Drawing Sheets

SPATIAL BEAMFORMER ARCHITECTURE

STAP ARCHITECTURE

MODES OF INTERFERENCE $$T_b = \begin{pmatrix} F_{b_1}^H S_{b_1} \\ \vdots \\ F_{b_{n_{user}-1}}^H S_{b_{n_{user}-1}} \end{pmatrix}$$

USE MODES OF FROM LAST SIGNAL
OF INTEREST ITERATION

MODES OF USER OF INTEREST $$F_a = (\vec{e}_1 \ldots \vec{e}_{n_{eig}})$$

96'  USE TOP $n_{eig}$ MODES $$[(S_X S_X^H)^{-1} S_X P_{Z_X} S_X^H] \vec{e}_l = \lambda_l \vec{e}_l$$

FIG. 10e

MULTICHANNEL MULTIUSER DETECTION

RELATED APPLICATIONS

This application claims the benefit of U.S. Provisional Application No. 60/242,548, filed Oct. 23, 2000. The entire teachings of the above application are incorporated herein by reference.

GOVERNMENT SUPPORT

The invention was supported, in whole or in part, by a grant under contract No. F19628-95-C-0002 from the U.S. Air Force. The Government has certain rights in the invention.

BACKGROUND OF THE INVENTION

The cellular telecommunications industry has been rapidly expanding since its inception, and is likely to continue at a phenomenal rate for at least the next few decades. Digital wireless connectivity for both voice and Internet access has experienced particularly high demand in the cellular market. Accordingly, the demand for higher user connectivity and for higher data rates continues. The problem of adding more cellular users can be solved by two fundamentally different approaches. One method is to reduce the cell size, increasing the total number of cells. This approach requires the installation of more cellular base stations. Another method is to employ more sophisticated signal processing to enable more efficient use of the available spectrum to accommodate multiple users.

There are two widely known approaches to multi-user access, that is how to share a single frequency allocation among multiple users within a cell, in digital wireless communications: time division multiple access (TDMA), and code division multiple access (CDMA). TDMA, used for GSM (Global System for Mobile) phones, is currently the most popular approach. In this approach, each user in a cell takes a turn in time. While one user is transmitting, all other users in the cell remain quiet. In CDMA, used by Qualcomm (IS-95), users transmit simultaneously, in the same frequency allocation. The signal for a given user is disentangled from all others by using its unique spreading sequences. The next generation of cellular phone systems (3G) will use CDMA.

In a multiuser spread spectrum system, such as a CDMA (Code Division Multiple Access) system, wireless transmissions are received simultaneously from many users. Any single transmission can be reflected from a variety of objects, causing the same transmission to be received in a multiple, overlapping forms of varying signal strength at various delays and at various angles of arrival. Multiple arrivals arising from a single transmission are often called multipath. The spreading code assigned to each user can be used to identify individual signals, but the fact that many users are received simultaneously (cochannel interference) means that extracting the information content from each transmission is difficult. Signals are distinguished from each other by spreading codes, and by patterns in multipath delays and angles of arrival. Techniques that exploit these differences can be used to mitigate cochannel interference. For example, angular (spatial) separations between signals can be exploited by using arrays of antenna elements, which are sensitive to angles of arrival. Temporal differences between signals due to spreading codes and multipath can also be exploited with or without the use of antenna arrays. Both spatial and temporal interference suppression are computationally intensive. Accordingly, it is generally infeasible to perform both spatial and code mitigation while maintaining acceptable communication throughput in a wireless communication system.

SUMMARY OF THE INVENTION

For multiaccess wireless communication systems such as CDMA, given a set of user spreading codes and multiple antenna elements, coefficients of a space-time beamformer are adjusted and the beamformer outputs are processed to estimate data symbols. Each data symbol is remodulated using estimates of the multipath for that symbol and subtracted from the received antenna signals to provide temporal mitigation of interference for other users of the wireless communication system. The space-time beamforming and temporal mitigation of interference are iterated until the estimates of data symbols converge in the sense of a predetermined decision criteria. The same demodulation techniques can be employed in multiple input (more than one transmit antenna), multiple output (multiple receive antennas) MIMO links whether or not a single user or a network or users are involved.

In such a wireless communication system, wireless transmissions are received at one or more antennas. Accordingly, the same transmission may be received at multiple antennas. Further, the wireless transmission may be reflected or refracted from obstacles in the transmission path such that the same transmission is received at multiple delayed times that differ at each antenna. The receiver utilizes a beamformer that combines various delayed versions of the output from each antenna in order to provide the most reliable data decision for a particular user. Each user requires a different beamformer. The spreading code is used to determine the beamformer coefficients by correlating with the delayed outputs. Prior to beamforming, the antenna outputs may have had other users temporally mitigated. Thus the beamformer only needs to mitigate residual power from other users that are known to the wireless system (known spreading codes) or unknown (users in adjacent cells).

In a multi-user system, transmissions of other users are also be received by the antenna. For each user in turn, the remaining users constitute interference that must be mitigated in order to demodulate successfully. Mitigation can occur through spatial filtering based on multiple antenna elements, through linear temporal filtering based on spreading codes and multipath delay patterns, and through nonlinear temporal filtering based on feedback from the demodulation of interfering cochannel signals. Previous data decisions, correct or not correct, are used in conjunction with estimates of multipath delays in order to mitigate cochannel signals. Mitigation occurs by remodulating the demodulated data in accordance with the spreading code of the signals and estimated multipath delay pattern. The resulting signals (all but the signal currently being demodulated) are subtracted from the antenna outputs, which are then fed to an adaptive space-time beamformer whose output is demodulated to form the estimated data of the signal currently being demodulated. Each signal, in turn, is demodulated in this fashion. When all signals have been demodulated. The process is iterated until a convergence criterion is satisfied. The exact manner in which signals are subtracted from the antennas varies according the iteration and convergence criterion.

The spreading code can also be indicative of the particular data symbol transmitted. Spreading codes are known in the wireless industry and are represented by various industry standards such as IS-95. In an IS-95 CDMA transmission, one of 64 symbols may be received, each symbol using a different, but related, spreading code. The symbol is demodulated, in principle, by correlating the output of the space-time beamformer with each of the candidate spreading codes. The largest correlation selects a spreading code, constituting demodulation.

In CDMA systems, users are physically distributed away from the antenna at various distances. Typically, users from more remote locations tend to be received as more attenuated signals. Similarly, signals from nearby users are typically received with less attenuation. Some wireless systems vary the signal power level to accommodate attenuation. In such systems, however, a transmission having a greater received power level can cancel transmissions of a lower received power level. For this reason, precise base station power level regulation must be employed such that all transmissions, or delayed signals, are received within an acceptable power spread, or range. Each iteration of the multichannel multiuser detector described above successfully demodulates more and more signals. Signals tend to be successfully demodulated in the order of received power, taking into account beamforming gain and multipath. It is often advantageous for the basestation to set received power levels in such a manner that convergence is accelerated.

In the invention as defined by the present claims, the transmissions corresponding to interfering users are processed as interference rather than noise. Rather than ignoring the signals corresponding to other users, as in typical prior art systems, interfering signals received at multiple antenna elements and multiple delays are demodulated and subtracted from the antenna elements, leaving in principle, only the signals corresponding to the user of interest. Both spatial and temporal structures of the data are exploited in the signal processing. By treating the transmissions of other users as interference, rather than noise, sensitivity to precise power level regulation is avoided, since the stronger signals are more easily separated from the weaker signals and are eventually mitigated when the weaker signals are demodulated. In this manner, interference from other users is intelligently mitigated, in contrast to traditional approaches which ignore the effects of in-cell and out-of-cell interference by treating these effects as noise.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10b shows a block dataflow diagram of multichannel multiuser detection corresponding to FIG. 10a;

FIGS. 10c–10e show computations and equations corresponding to the maximum likelihood embodiment of multichannel multiuser detection;

FIG. 12b shows computations and equations corresponding to the minimum mean squared error embodiment of multichannel multiuser detection of FIG. 12a.

DETAILED DESCRIPTION OF THE INVENTION

A description of preferred embodiments of the invention follows.

In a multiuser CDMA system, a plurality of users are provided a communication link from a cellular subscriber unit, such as a cellular phone or user PC, to a cellular base station, which is connected to a wired network. In this manner, users are provided wireless access to the wired network. Transmissions from the wired network are sent from the base station to the cellular subscriber unit on a forward link. Transmissions from the cellular subscriber unit to the base station are sent on a reverse link shared by multiple users. The invention defined by the present claims is directed to multi-user access on the reverse link of a CDMA system. Alternatively, the invention could be employed on the forward link according to a modified wireless protocol. Further, a hybrid system employing CDMA within TDMA (Time Division Multiple Access) segments can be employed.

Figure 1:
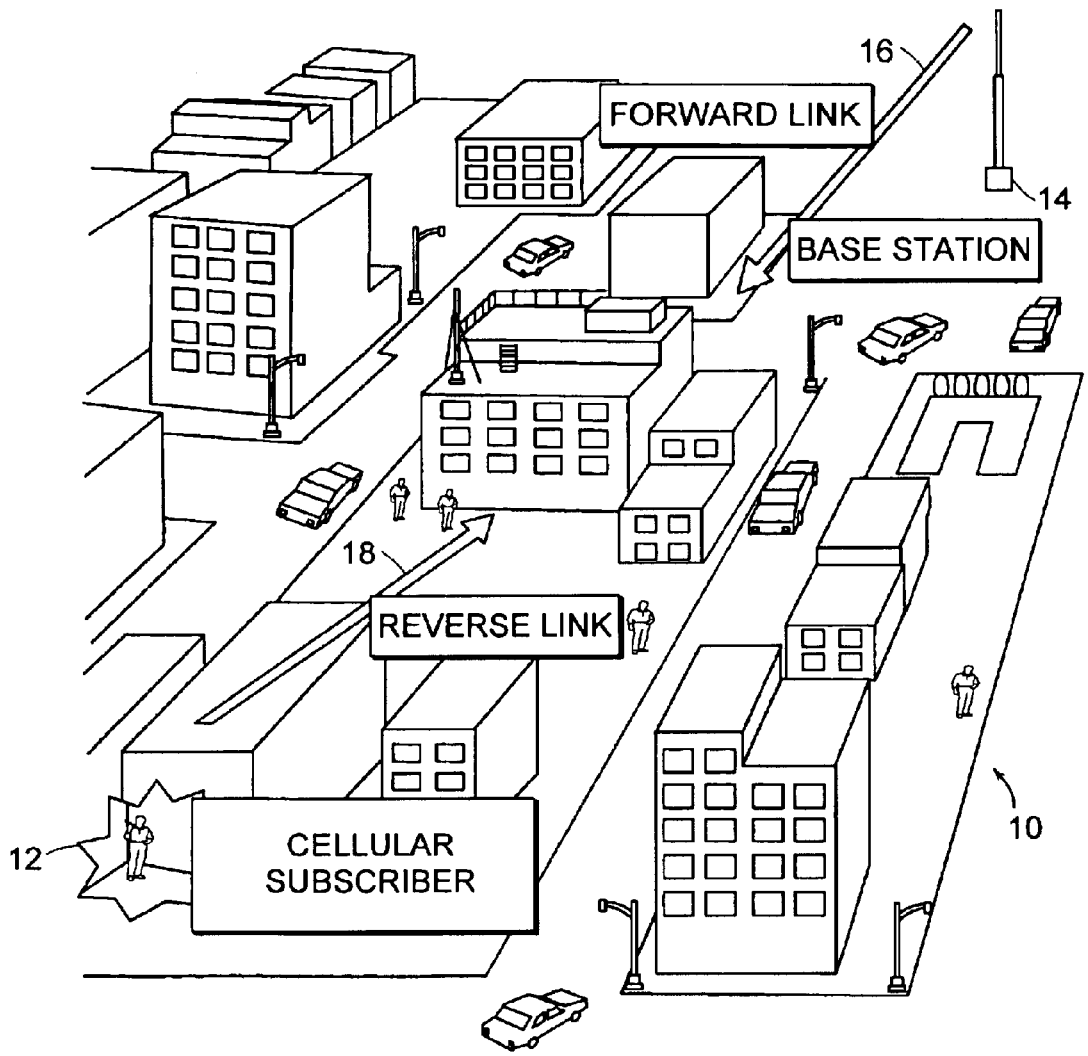
FIG. 1 shows a wireless communication system environment.

Referring to FIG. 1, a wireless communication environment 10 is shown. One or more cellular subscriber users 12 is provided a wireless connection to a public access network such as the Internet or voice phone network via a base station 14. Transmissions from the base station to the user are transmitted on a forward link 16. Transmission from the user to the base station are transmitted on a reverse link 18.

Figure 2A:
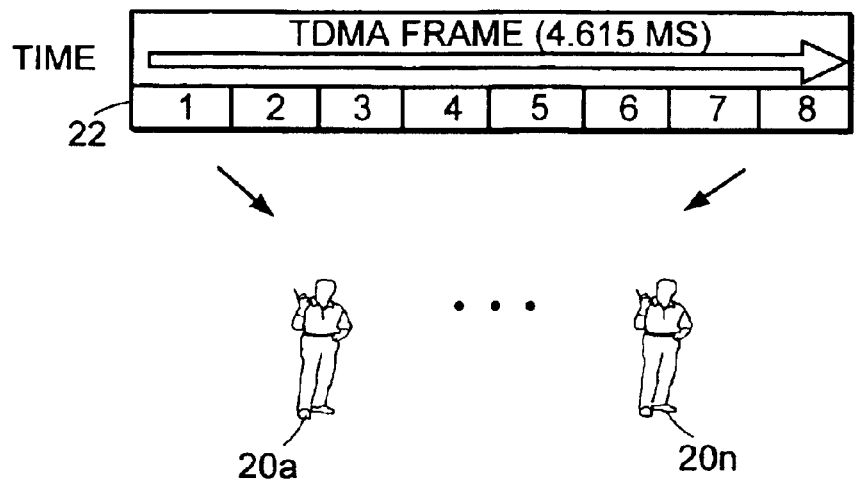
FIGS. 2a and 2b show wireless communication protocols.
Figure 2B:
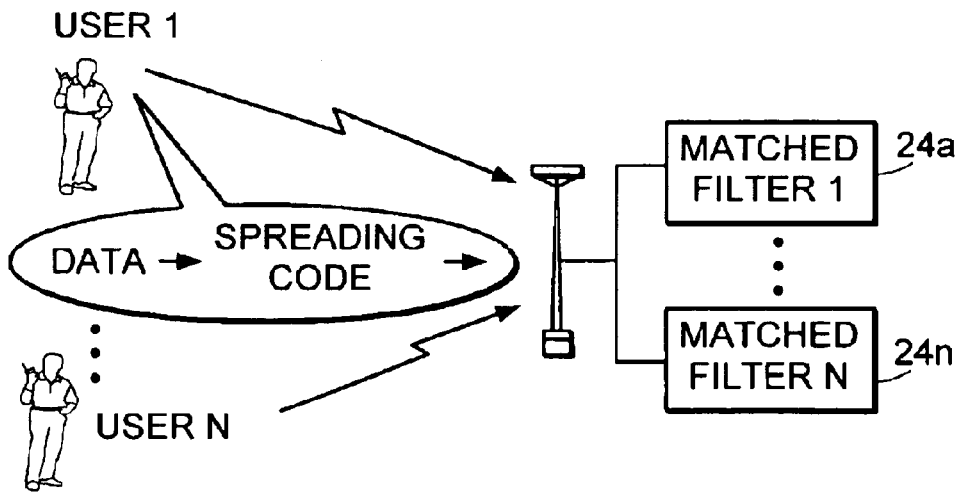

FIGS. 2a–2b show TDMA and CDMA wireless standards. Referring to FIG. 2a, a TDMA system, such as GSM is shown. Multiple users 20a–20n are each provided a time slot 22 for transmissions. The time slots repeat frequently such that each user 20a–20n has the impression that the user has a dedicated connection. Each user, therefore, is separated in time, space, and frequency. Referring to FIG. 2b, in a CDMA system, each user is assigned a different spreading code. Each item of data, or symbol, is expanded according to the users spreading code. When the spread code is received, it is indicative of both the transmitted symbol and the identity of the user. A filter 24a–24n corresponding to the spreading code is applied to the received spread code to determine the transmitted symbol. In this type of system, users 22a–22n are separated in code, space, and frequency.

Figure 3:
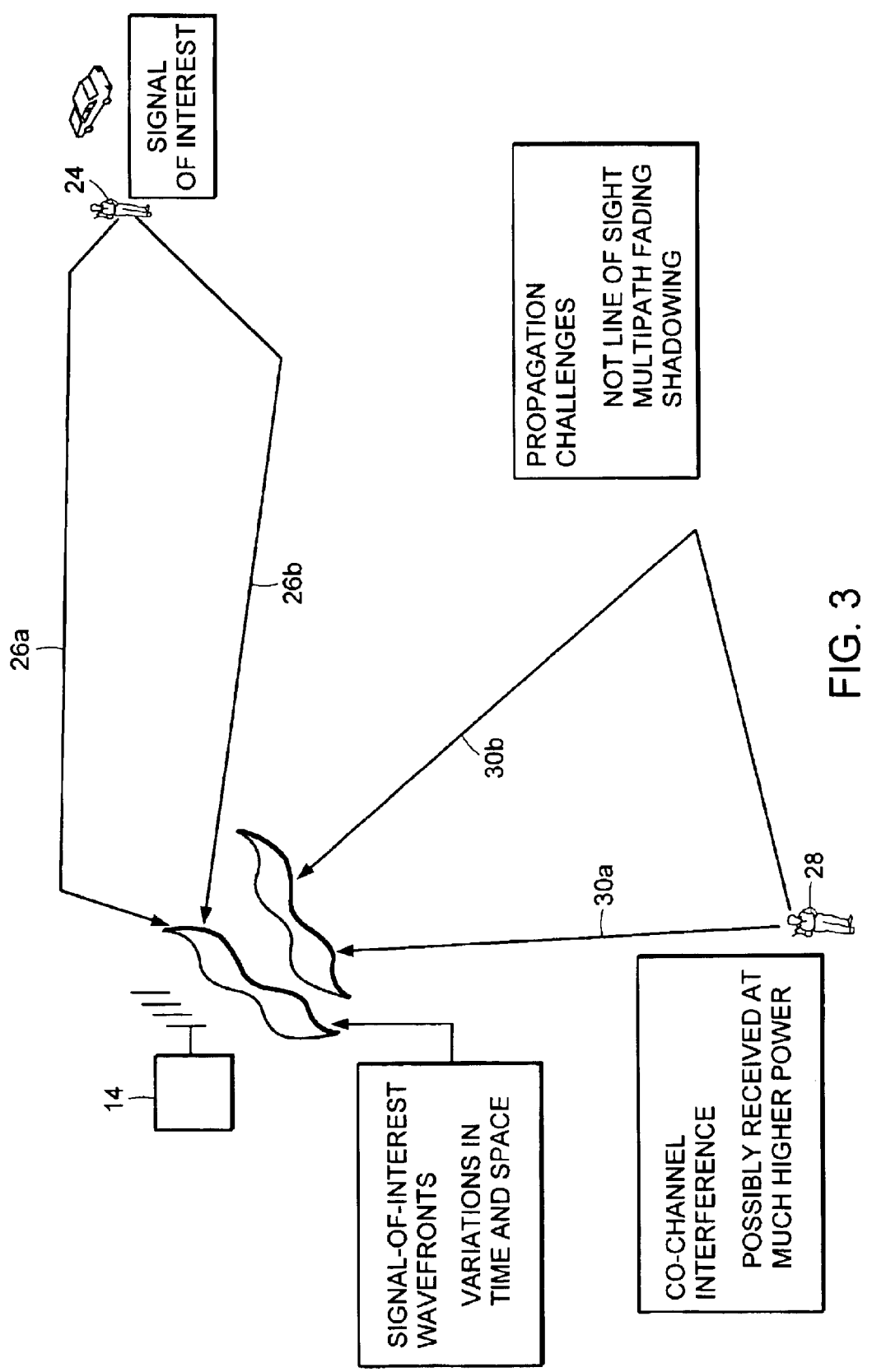
FIG. 3 shows wireless signal propagation.

FIG. 3 shows propagation of a wireless signal over the reverse link in a wireless communication network. A user of interest 24 transmits a signal to the base station 14. Factors such as land topography, buildings, antenna location, and others affect the transmission of the wireless signal through reflection and refraction. Accordingly, the wireless signal travels via multiple paths 26a, 26b to the base station 14. As the same wireless signal 26a, 26b travels via multiple paths to the base station, one or more delayed signals are received at the base station 14. Further, an interfering user 28 sends interfering signals 30a, 30b to the base station 14. Variations in power between the user of interest and the interfering user can cause the signal of interest to be masked.

Figure 4:
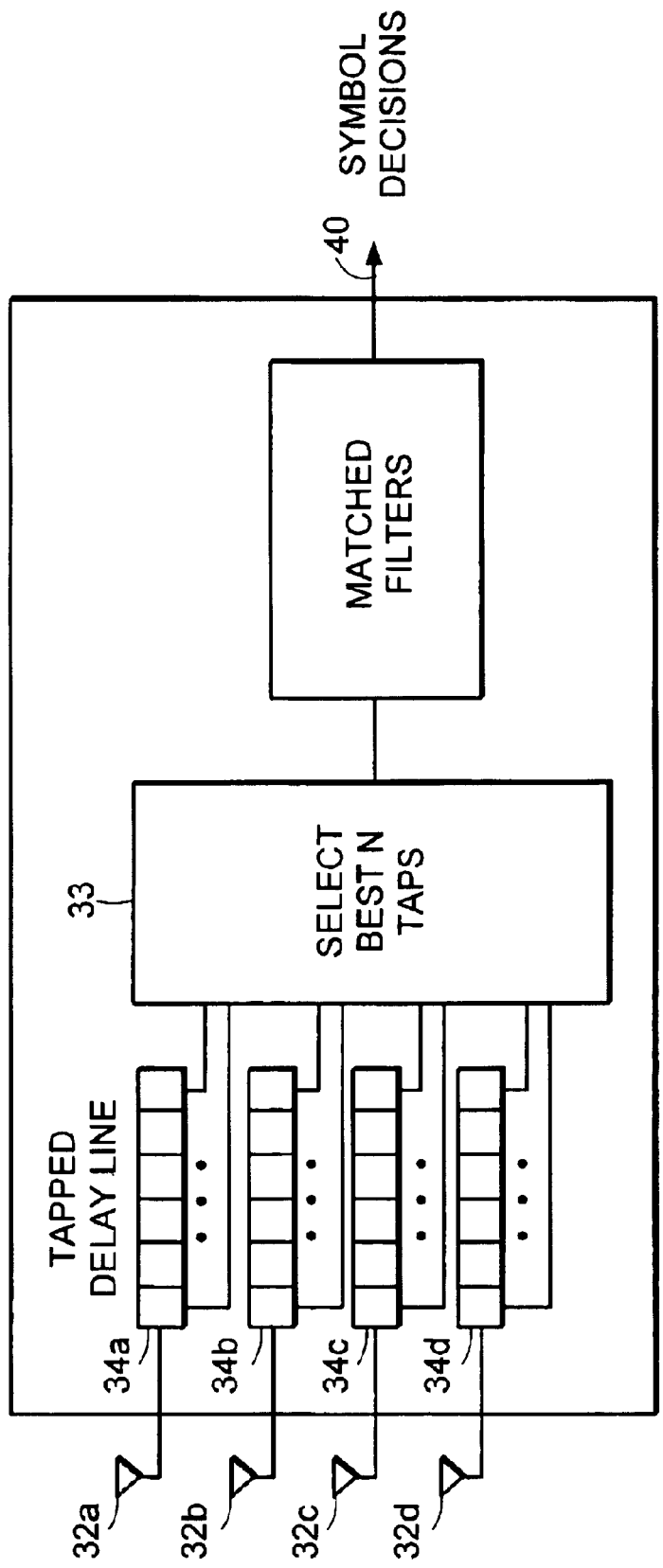
FIG. 4 shows a wireless signal demodulator and delay line.

FIG. 4 shows the use of a prior art tapped delay line used to determine the intended signal from among the received delayed signals. Wireless signals are received at on or more antennas 32a–32d. The wireless signals are received as a plurality of delayed signals in a tapped delay line 34a–34d corresponding to each antenna. The delayed signals are correlated by a correlator 33 to determine the best taps which are indicative of the intended signal. A filter 38 is then used to determine the corresponding user based on the spreading codes. Symbol decisions 40 are then output when the correlated, filtered signal attains a sufficient likelihood of representing the intended signal. This type of approach can be most effective if the power spread between the signals from different users is small.

Figure 5:
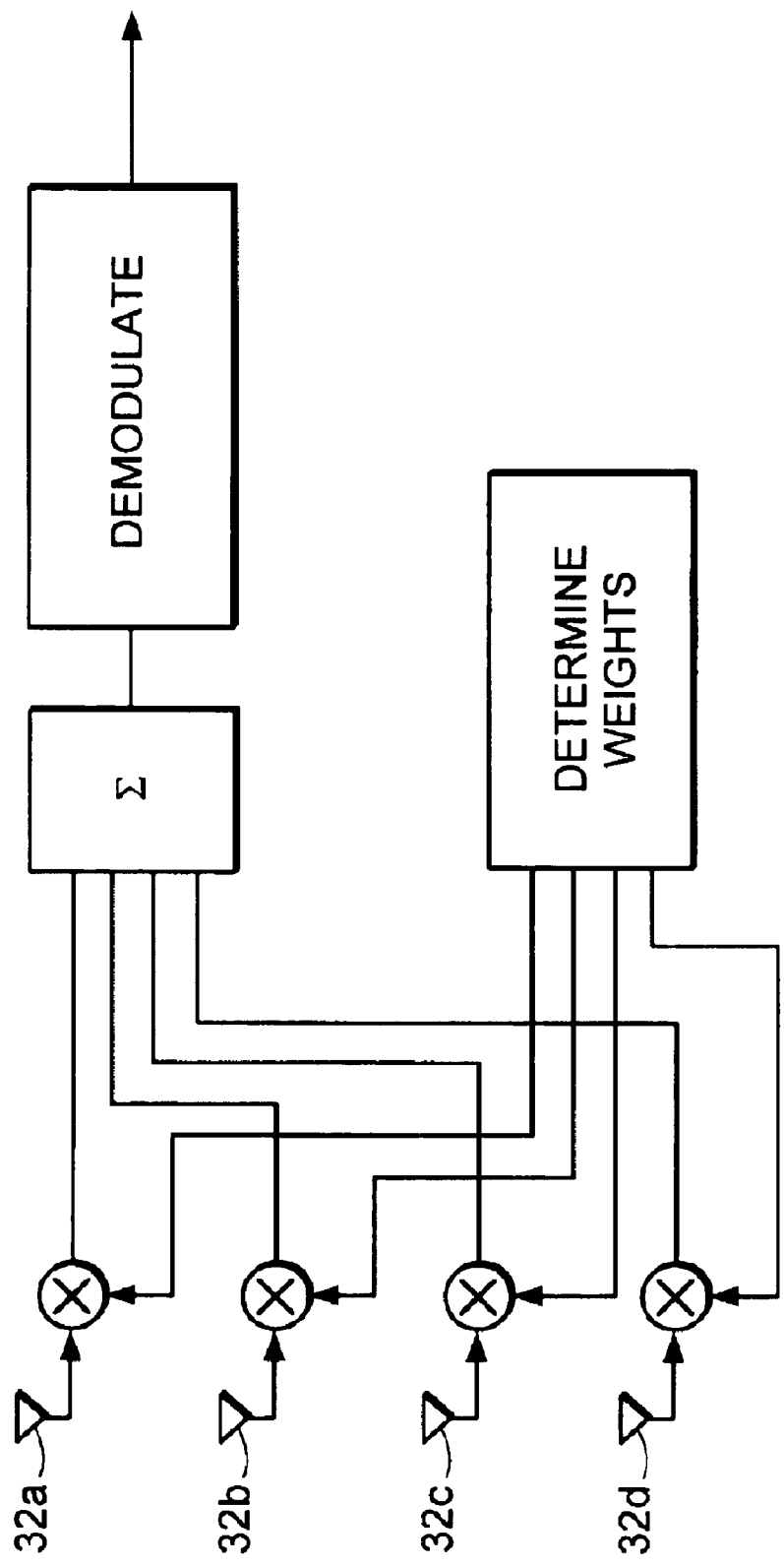
FIG. 5 shows a spatial beamformer demodulator.

FIG. 5 shows a spatial beamformer architecture. This type of system is used to spatially null interfering signals by examining the wireless signal received at each of a plurality of antennas 32a–32d. This system uses decision feedback based on demodulating the reverse-link symbols in order to adapt its beam. A relative weight is determined for each of the transmissions received at each antenna 32a–32d. The signals are then summed, correlated, and demodulated to determine the intended signal. This approach works well when the number of uncorrelated modes is smaller than the number of antennas.

Figure 6:
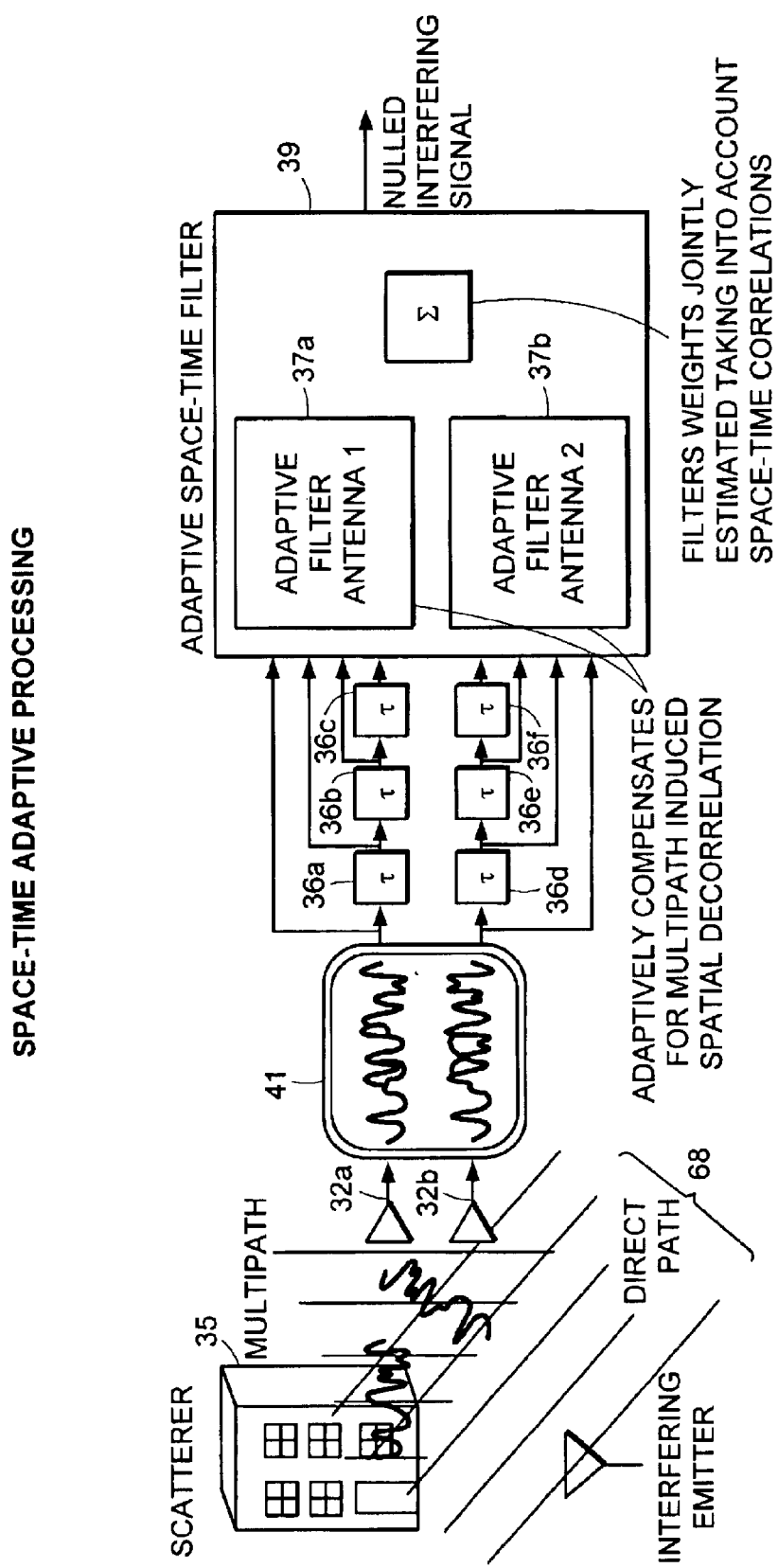
FIG. 6 shows space-time adaptive beamforming.

FIG. 6 shows space-time adaptive processing (STAP) using a space-time adaptive filter. Referring to FIG. 6, a plurality of antenna signals 68 may be reflected or refracted by one or more scatterers 35, such as buildings, trees, land topography, and others. These signals 68 are received at a plurality of antennas 32 and passed through a set of tapped delay lines 36 generally. The delay lines include a plurality of taps 36a–36f, from which the best taps are received into the adaptive filter antennas 37a–37b. The adaptive filters 37a–37b at each of the antennas separate the signal from the multi-mode interference due to other signals. The filter coefficients are set by correlating the spreading codes of the user of interest with the tap outputs 36a–36f.

Figure 7:
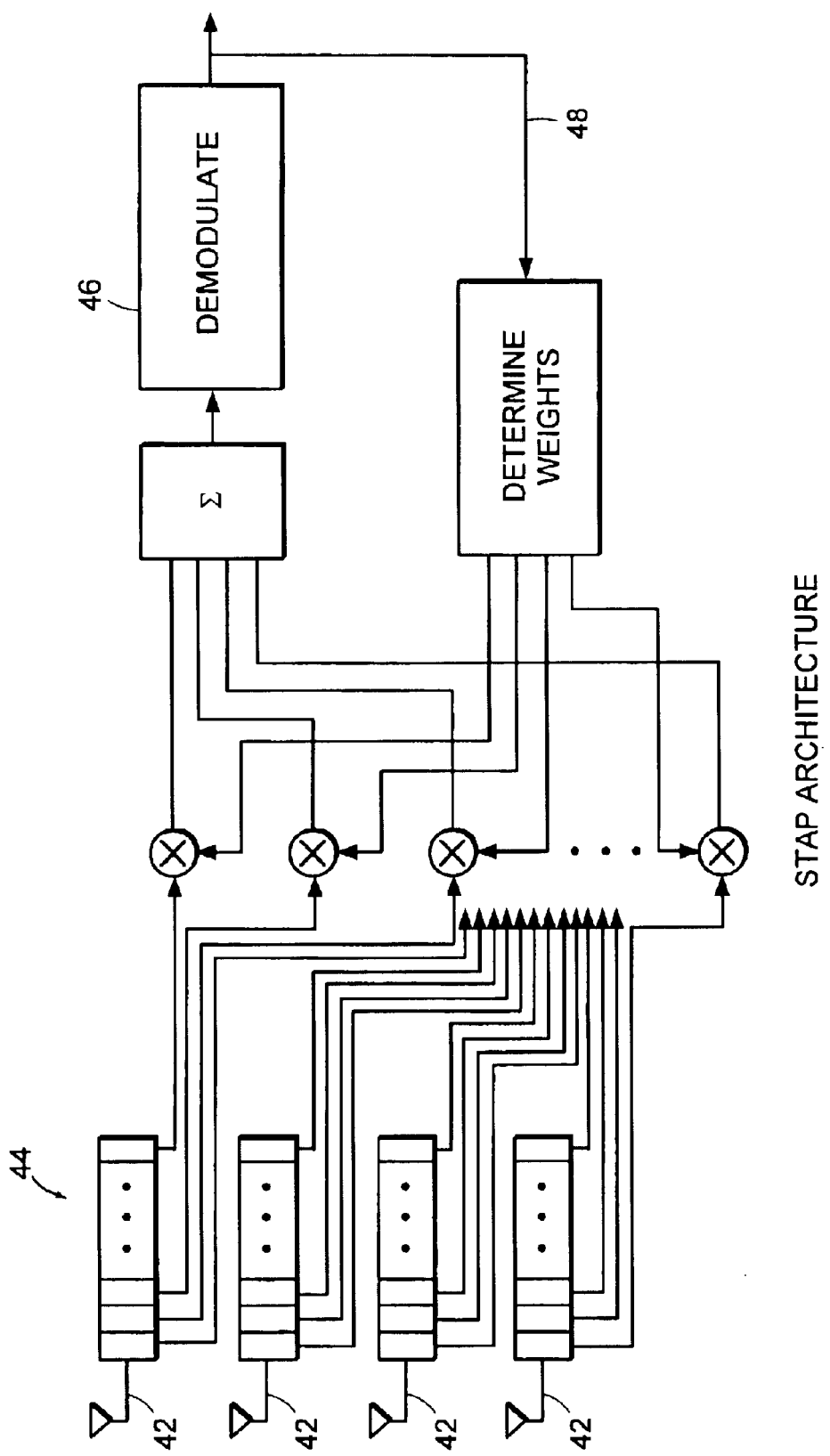
FIG. 7 shows a space-time adaptive beamformer.

FIG. 7 shows space-time adaptive beamforming. A linear weighting of the data across space, or the antenna outputs 42 and time, or delay taps 44 are transmitted to the demodulator 46. Weights are adjusted by decision feedback via feedback line 48.

Figure 8:
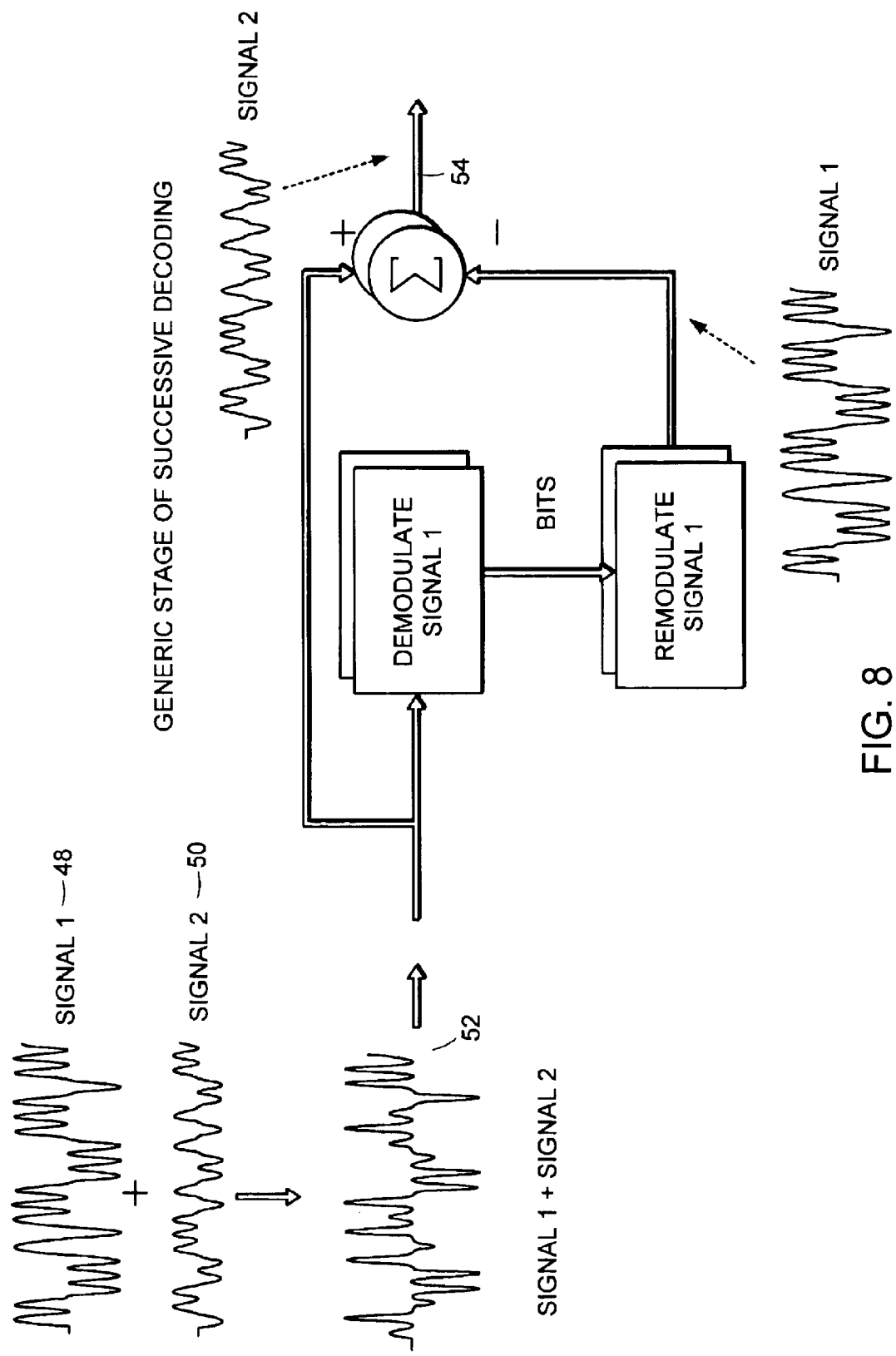
FIG. 8 shows multiuser detection via demodulated signal subtraction.

FIG. 8 shows a block diagram of multiuser detection as defined by the present claims for the simple case of one antenna element. Referring to FIG. 8, a first signal 48 corresponding to a user of interest and a second signal 50 from an interfering user appear at an antenna as a summed signal 52. The first signal 48, having a greater magnitude, will cause the second signal 50 to appear as noise in the first signal 48 in the summed signal 52. The first signal is demodulated, remodulated, and subtracted from the summed signal 52 to determine the second signal 50 as an output 54. The first signal 48 is computed through correlation and convergence as described in greater detail below. Further, a plurality of signals may comprise the summed signal 52 that is actually received. The signal having the greatest magnitude would be determined as the first signal 48, and the remaining signals would remain aggregated as the second signal 50. The signal having the next greatest magnitude is then determined in the same manner, and the second signal 50 remains representative of the aggregation of the remaining signals in the summed signal 52.

Figure 9:
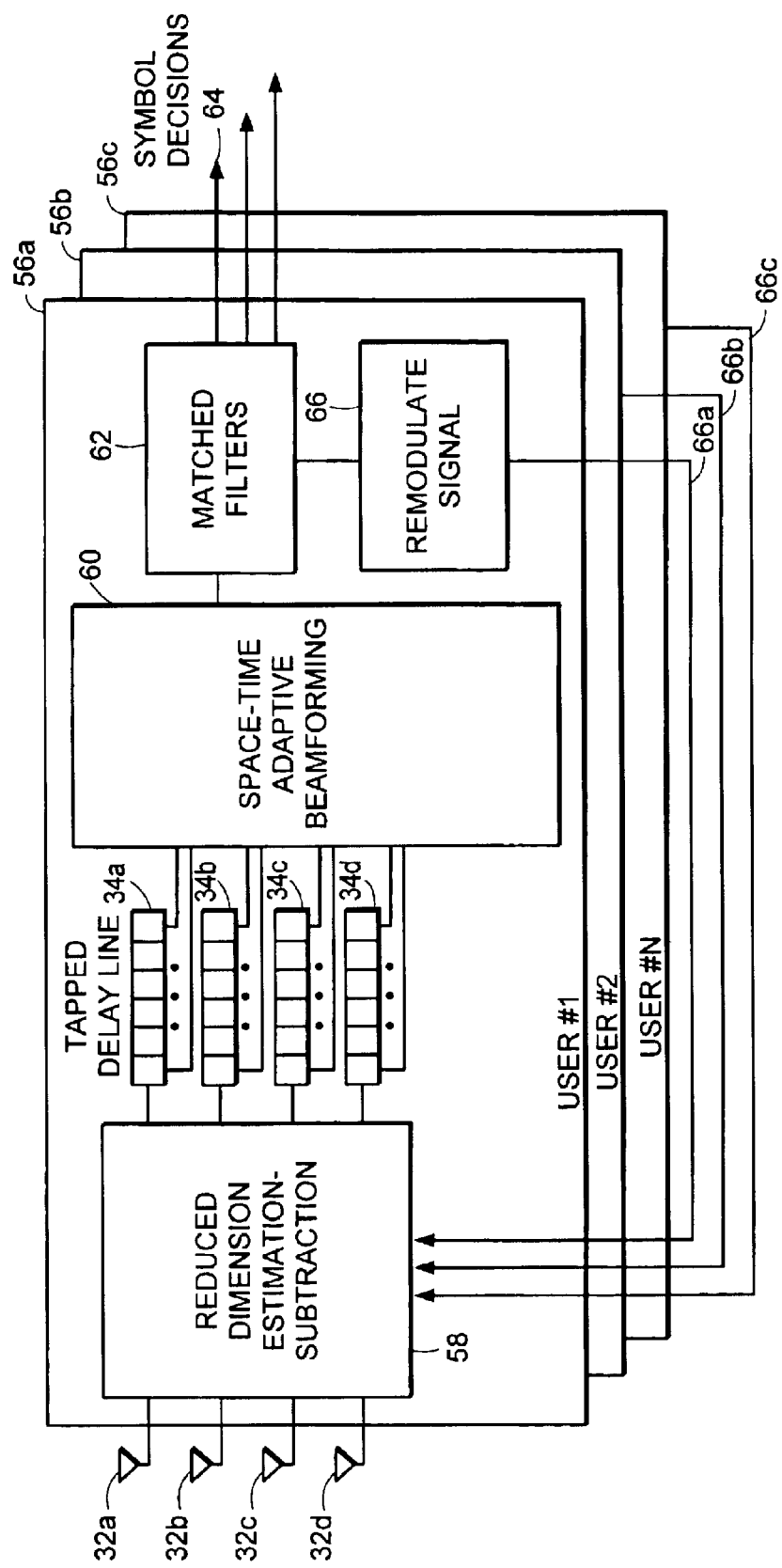
FIG. 9 shows multichannel multiuser detection as defined by the present claims.

FIG. 9 shows multichannel multiuser detection similar to that described above with respect to the signals of FIG. 8 as applied to a plurality of users. Multiple parallel instantiations of correlation processes, or detectors 56a–56c are invoked, each corresponding to a particular user. For a particular user, as determined by the spreading code corresponding to that user, the signals corresponding to other users appear as interference. By successive detection and feedback, the signals corresponding to each user will tend to converge and the signals corresponding to other users will tend to be driven to zero. When the convergence has reached an acceptable threshold, as determined by the decision criteria, the converged, correlated signal is accepted as the intended signal.

In more detail, a number of wireless signals are received at several antennas 32a–32d. Several instantiations of detectors 56a–56c, each corresponding to a particular user, are invoked. The multiplicity of instantiations, each performing a series of correlation processes, will be discussed further below. With respect to FIG. 9, a single detector 56a will be discussed. If necessary, the data dimensionality is reduced 58. The resultant signals are then sent through a tapped delay line 34a–34d, described above. The signals selected from the best taps are processed via space-time adaptive beamforming 60, described above. The signals are then processed via matched filters 62, and a signal decision occurs. If the signals have converged as determined by a predetermined threshold, the demodulated signal is taken to be indicative of a symbol in the intended transmission, and is output as the correct signal decision 64. The signal is then remodulated 66, and fed back to the nonlinear temporal filter 58 via feedback lines 66a–66c. Note that the remodulated signal carried on the feedback lines 66b–66c received from the detectors 56b–56c corresponding to other users is also sent to 58. In this manner, successive detections, described in more detail below, are performed on the received data. For each detector 56 corresponding to a particular user, the signals corresponding to other users are driven towards zero. When a convergence sufficient to indicate a good symbol decision is achieved, the result is taken as the intended signal.

Following are three embodiment of multi-channel multi-user detection. In a maximum likelihood (ML) embodiment, symbol decision made by the demodulator are remodulated and subtracted from the data to reduce cochannel interference. A minimum mean-squared (MMSE) error embodiment employs a full interference matrix. An alternate MMSE embodiment, called a reduced dimension MMSE embodiment, employs a reduced dimension space-delay data matrix. Different embodiments may tend to converge more readily depending on the nature of the received data.

The multichannel multiuser detector defined herein depends on forming the complex correlations of various quantities. Many of the quantities can be expressed as matrices or vectors. Following is a list of the terms employed in the computations. These terms are referenced in the figures described below along with a brief description of their usage:

$$Z: n_{elem} \times n_{samp} = (\vec{z}(t_1) \vec{z}(t_2) \ldots \vec{z}(t_{n_{samp}}))$$

The data matrix contains a set of samples over time of the complex baseband signals received at each antenna.

Reference signal for a given symbol sequence $$S: n_{delay} \times n_{samp} = \begin{pmatrix} s_1 & s_2 & s_3 & s_4 \\ s_2 & s_3 & s_4 & s_5 \ldots \\ s_3 & s_4 & s_5 & s_6 \\ & & \vdots & \end{pmatrix}$$

The reference for a given user contains the complex baseband signal assuming the particular spreading code and data symbol for that user. Multiple delayed versions of the sequence are placed in subsequent rows.

Interference matrix $$T_b : [n_{mode} \cdot (n_{user} - 1)] \times n_{samp} = \begin{pmatrix} F_{b_1}^H S_{b_1} \\ \vdots \\ F_{b_{n_{user-1}}}^H S_{b_{n_{user-1}}} \end{pmatrix}$$

The interference matrix contain an estimate of the complex baseband remodulated sequences for all interfering user, including linear combinations of delayed versions of these sequences.

Interference projection matrix $$P_{T_b}, P_{T_b}^\perp : n_{samp} \times n_{samp}$$

$$P_{T_b} = T_b^H (T_b T_b^H)^{-1} T_b$$

$$P_{T_b}^\perp = I - P_{T_b} = X^H X, \quad XX^H = I$$

The interference projection matrix can be identified with a subspace associated with the interfering signals (or orthogonal to the interference signals for the "perp" version). The perp interference projection matrix can be factored into the Hermitian conjugate of X times X. X can be viewed as a temporal basis that is perpendicular to interference.

Space-time data matrix projected onto basis orthogonal to interference $$Z_X = ZX^H$$

The space-time data matrix projected onto a basis orthogonal to interference is a form of the space-time data matrix with temporal structures of the interfering signal subtracted off.

Eigenvalue and eigenvector of matrix $$\lambda_l\{M\}, \vec{e}_l\{M\}$$

This is a notation for the $l^{th}$ eigenvalue and eigenvector of the matrix, M.

Figure 10A:
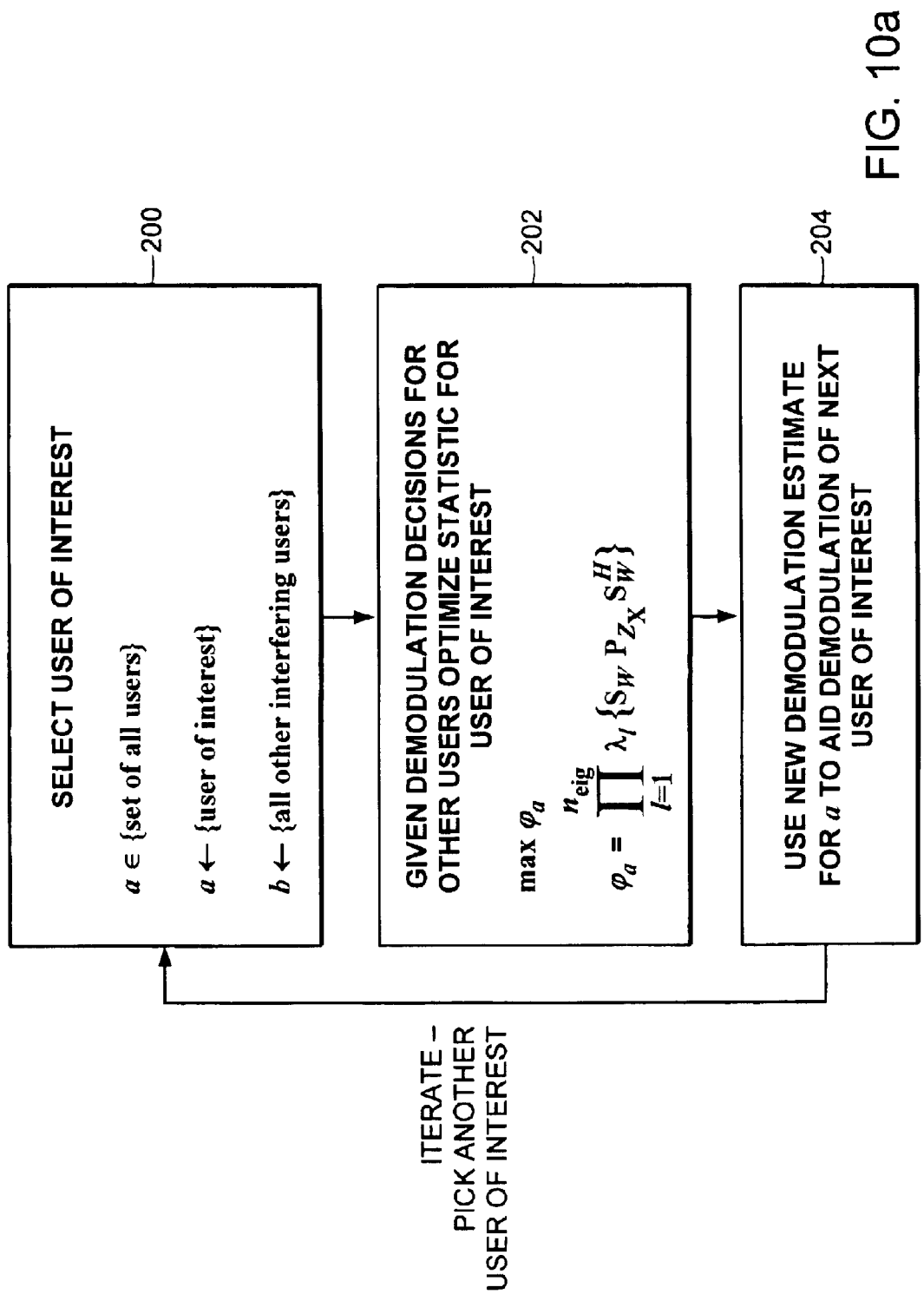
FIG. 10a shows a flowchart of a maximum likelihood embodiment of multichannel multiuser detection.

FIGS. 10a–10e show the maximum likelihood (ML) embodiment. FIG. 10a shows a flowchart of the maximum likelihood embodiment. The computationally expensive maximum likelihood problem is solved by iteratively cycling through users of interest. A particular user of interest is selected, as depicted at step 200. From the set of all users, a single user a is selected. The remaining users b are treated as interfering users with respect to a. Demodulation decisions made with respect to other users are used to compute demodulation decisions for the user of interest a, as shown at step 202. The new demodulation decisions for a are used in computations for a successive user of interest, as disclosed at step 204, and control reverts to step 200 with the successive user as a and the remaining users computed as interfering users. These iterations continue until the demodulation decisions for a particular user of interest a converge to an acceptable threshold.

Figure 10B:
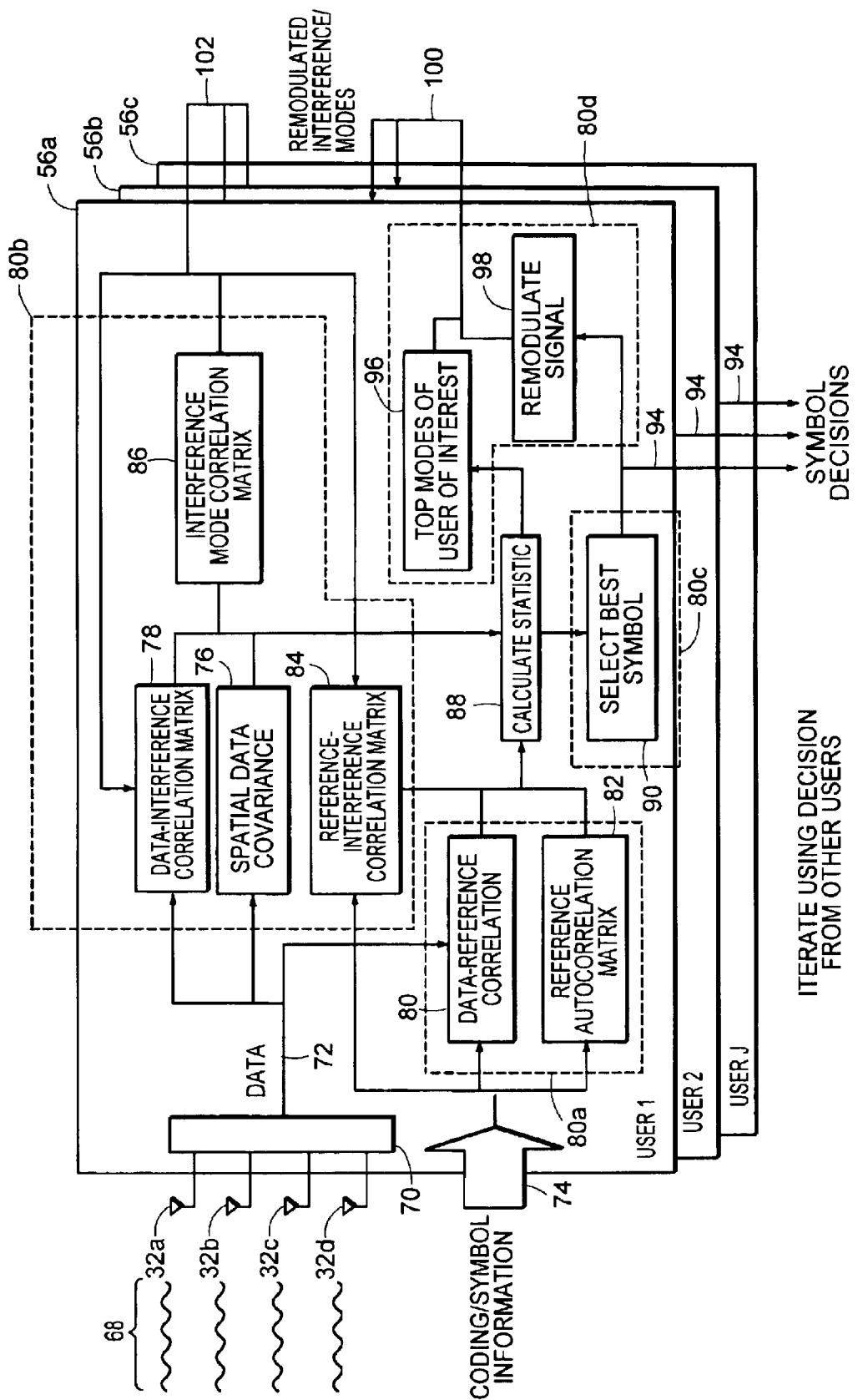

FIG. 10b shows the operations in the maximum likelihood embodiment. Each block corresponds to a particular operation, typically a correlation, which results in the output indicated by the name of the block. Each output is available as input to the operations performed in successive blocks as indicated by the arrows. Successive iterations result in convergence to a threshold which is indicative of a good decision. As indicated above, a good decision is accepted as indicative of the symbol contained in the intended transmission.

These operations correspond to the block diagram of FIG. 9 as indicated by the dotted lines 79a–79d, as follows: beamforming 60 is shown by dotted line 80a. Nonlinear temporal filtering is shown by 80b. Matched filters 62 are shown by 80c, and remodulated signals 66 are shown by 80d.

Continuing to refer to FIG. 10b, a plurality of wireless signals 68 in an RF (radio frequency) medium are received at a plurality of antennas 32a–32d. The wireless signals correspond to intended transmissions from a plurality of users. The wireless signals 68 are downconverted 70 into baseband data signals 72.

The coding/symbol information 74 defines the user specific spreading codes and the protocol for the symbols contained in the spreading codes. In a particular embodiment, such as an IS-95 compatible environment, each data symbol is indicative of six bits, hence there are 64 possible data symbols for each user. In alternate embodiments, other spreading code protocols could be employed, however.

The baseband signals 72 are sent to a data-interference correlation operation 78, a spatial data covariance operation 76, and a data-reference correlation operation 80.

Figure 10C:
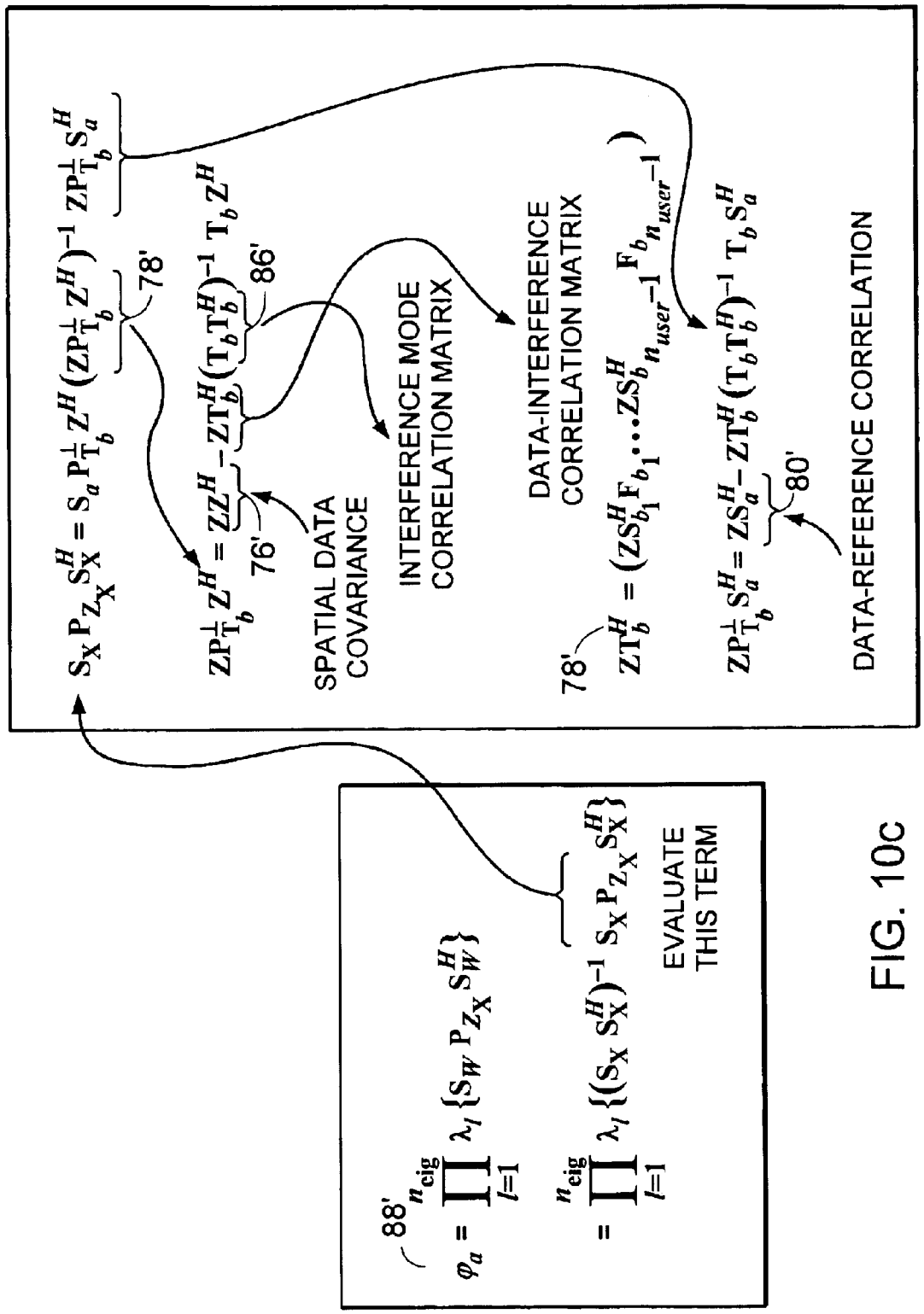

The data interference correlation matrix is given by:

$$ZT_b^H$$

and is computed as shown in FIG. 10c, to generate a data interference correlation matrix 78'. The data-interference correlation matrix contains an estimate of the similarity between the received signal and remodulated interfering user signals at various delays.

The spatial data covariance operation 76 produces a spatial data covariance matrix 76', shown by the term:

$$ZZ^H$$

The spatial data covariance matrix 76' contains an estimate of antenna-to-antenna correlations observed in the baseband signal data 72, and is employed as shown in FIG. 10c. The data reference correlation operation 80 receives the baseband signals 72 and the coding/symbol information 74, described further below, and produces a data reference correlation matrix 80':

$$ZS_a^H$$

which contains an estimate of the similarity between the received signal and the reference signal at various delays, employed as shown in FIG. 10c.

Figure 10D:
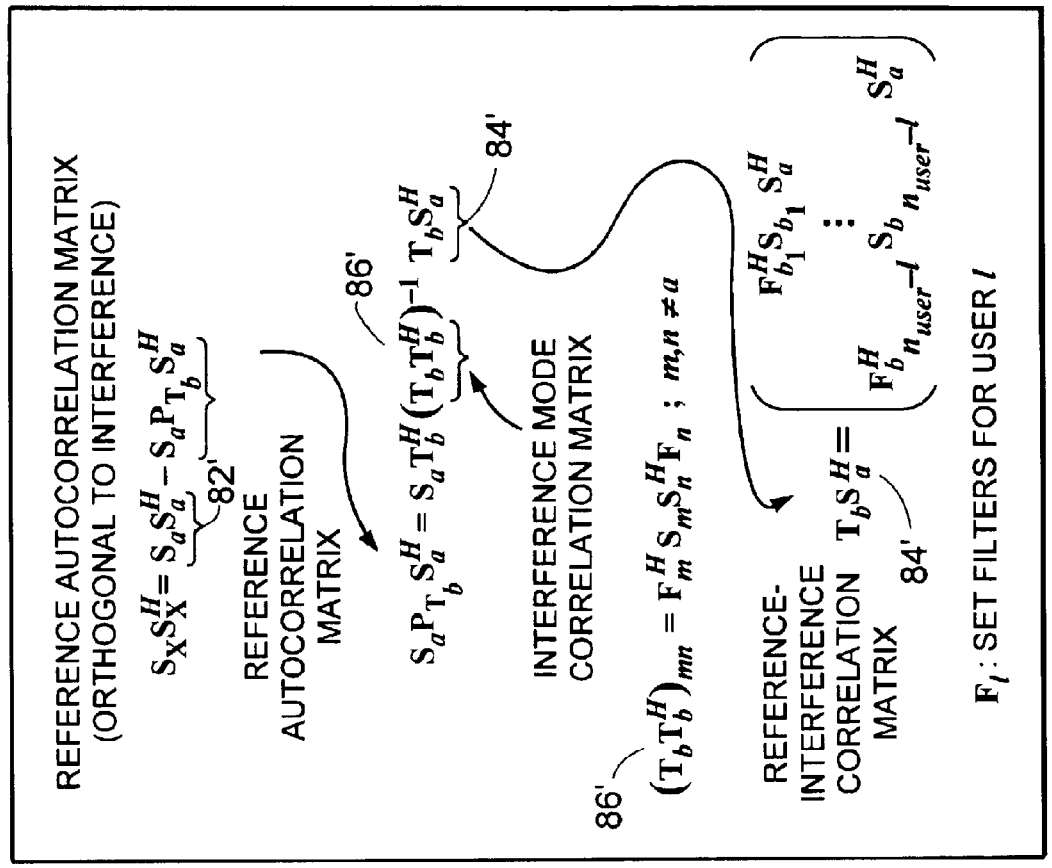
Figure 10D:
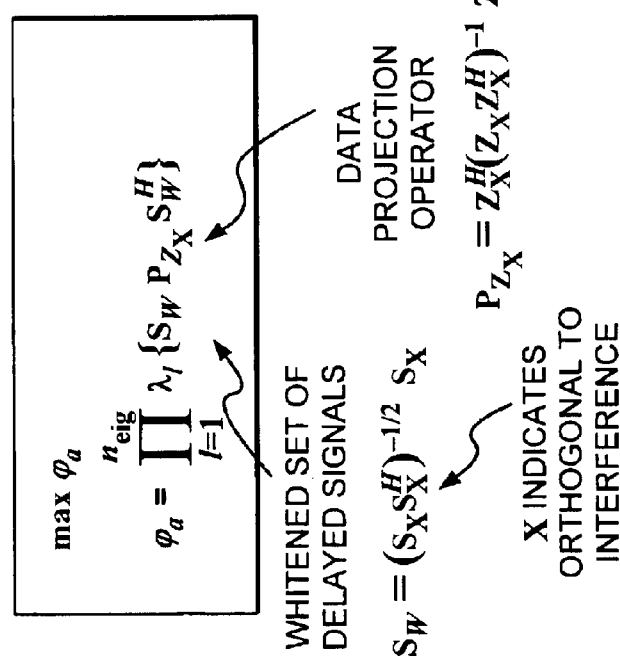

The coding/symbol information is employed by a reference autocorrelation operation 82, a reference interference correlation operation 84, and the data reference correlation operation 80. A reference autocorrelation matrix 82' computed by the reference autocorrelation operation 82 is given by:

$$S_a S_a^H$$

and contains a measurement of how similar the reference signal is to itself at various delays, as depicted in FIG. 10*d*.

A reference-interference correlation operation 84 also receives the coding/symbol information 74, and computes the reference-interference correlation matrix 84':

$$T_b S_a^H$$

The reference-interference correlation matrix contains a measurement of how similar the reference signal and the interference signals are to each other at various delays, computed as shown in FIG. 10*d*.

An interference mode correlation operation 86 computes the interference mode correlation matrix 86', employed as shown in FIG. 10*c*. The interference mode correlation matrix is given by:

$$T_b T_b^H$$

and contains a measurement of how similar the remodulated interference sequences are to themselves and other interfering sequences at various delays.

Each of the outputs 76', 78', 80' 82', 84', and 86' are used to calculate the statistic 88. The statistic is calculated by eigenanalyzing (in an approximate or degenerate sense) a particular function 88 of the matrices 76'–86'. A decision on the transmitted data symbol is formed in 90. Several iterations of the same steps will be required before the data decision settles down to its final value.

The top multipath modes of the user of interest 56*a* are formed in 96. The matrix representation of the selected modes of a user is given by $$F_f: n_{delay} \times n_{mode}$$

and contains a set of filters representing the multipath delay structure. Referring to FIG. 10*e*, the computation used to compute the top modes 96' is shown. The remodulated modes 100 are then sent to the interference mode correlation operation in the correlation processes instantiations 56*b*, 56*c* corresponding to other users. In this manner, the data corresponding to each user tends to converge based on correlations and remodulations of the data corresponding to other users. Similarly, the interference mode correlation matrix 86' corresponding in the present instantiation 56*a* receives the correlated, remodulated data 102 corresponding to other users 56*b*, 56*c*.

Figure 11A:
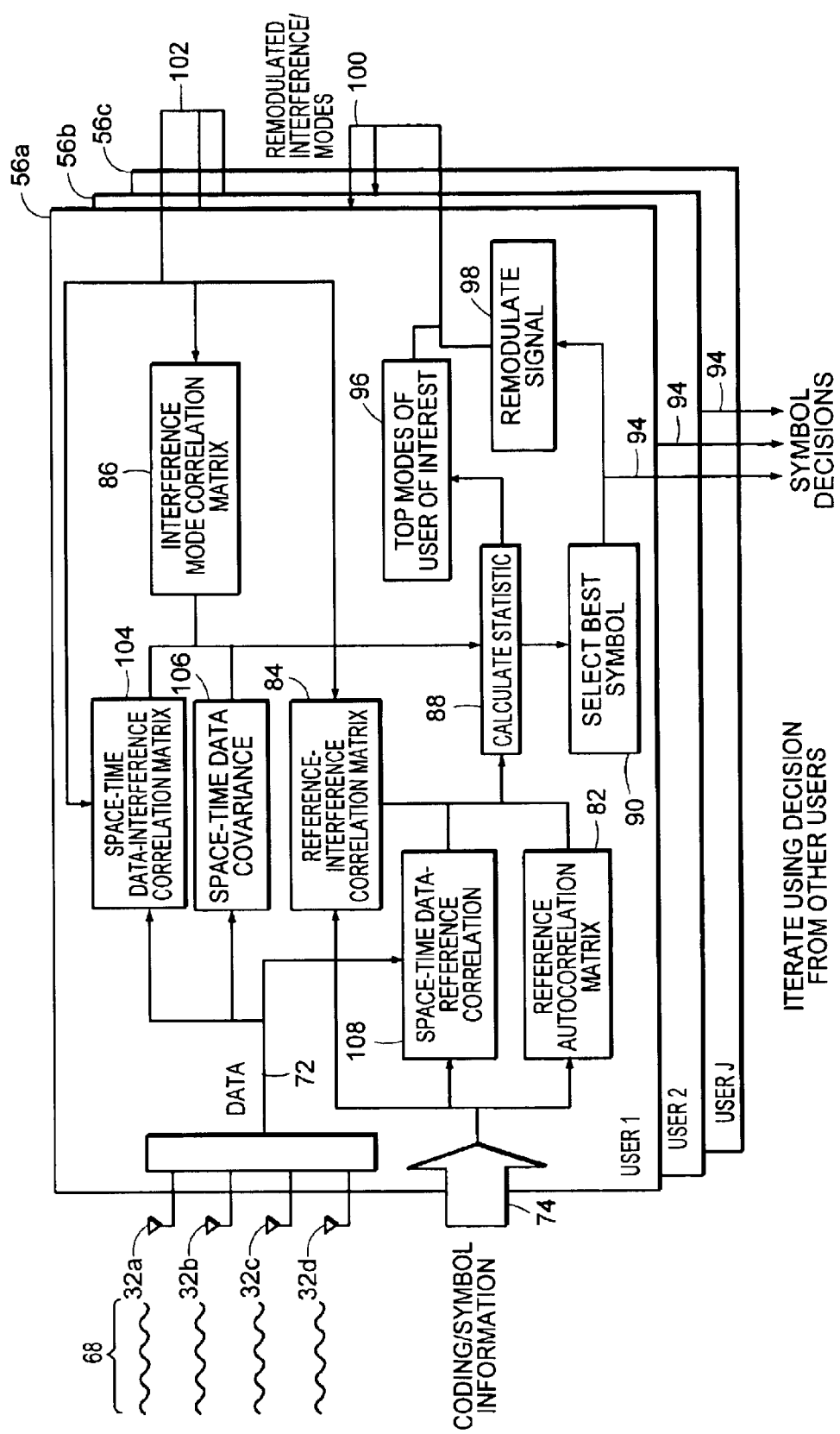
FIG. 11a shows a block dataflow diagram of a minimum mean squared error embodiment of multichannel multiuser detection.
Figure 11B:
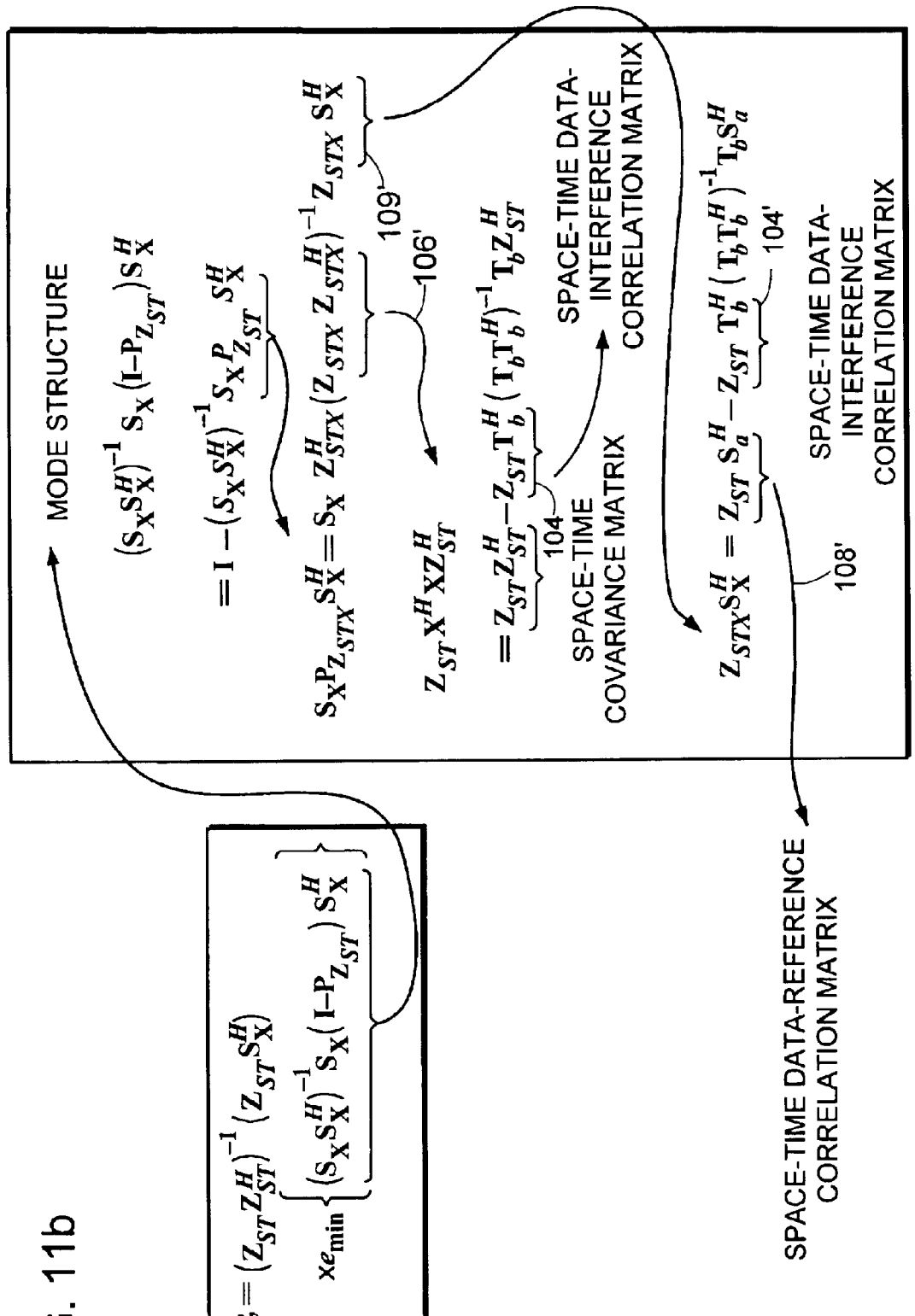
FIGS. 11b–11c show computations and equations corresponding to the maximum likelihood embodiment of multichannel multiuser detection.
Figure 11C:
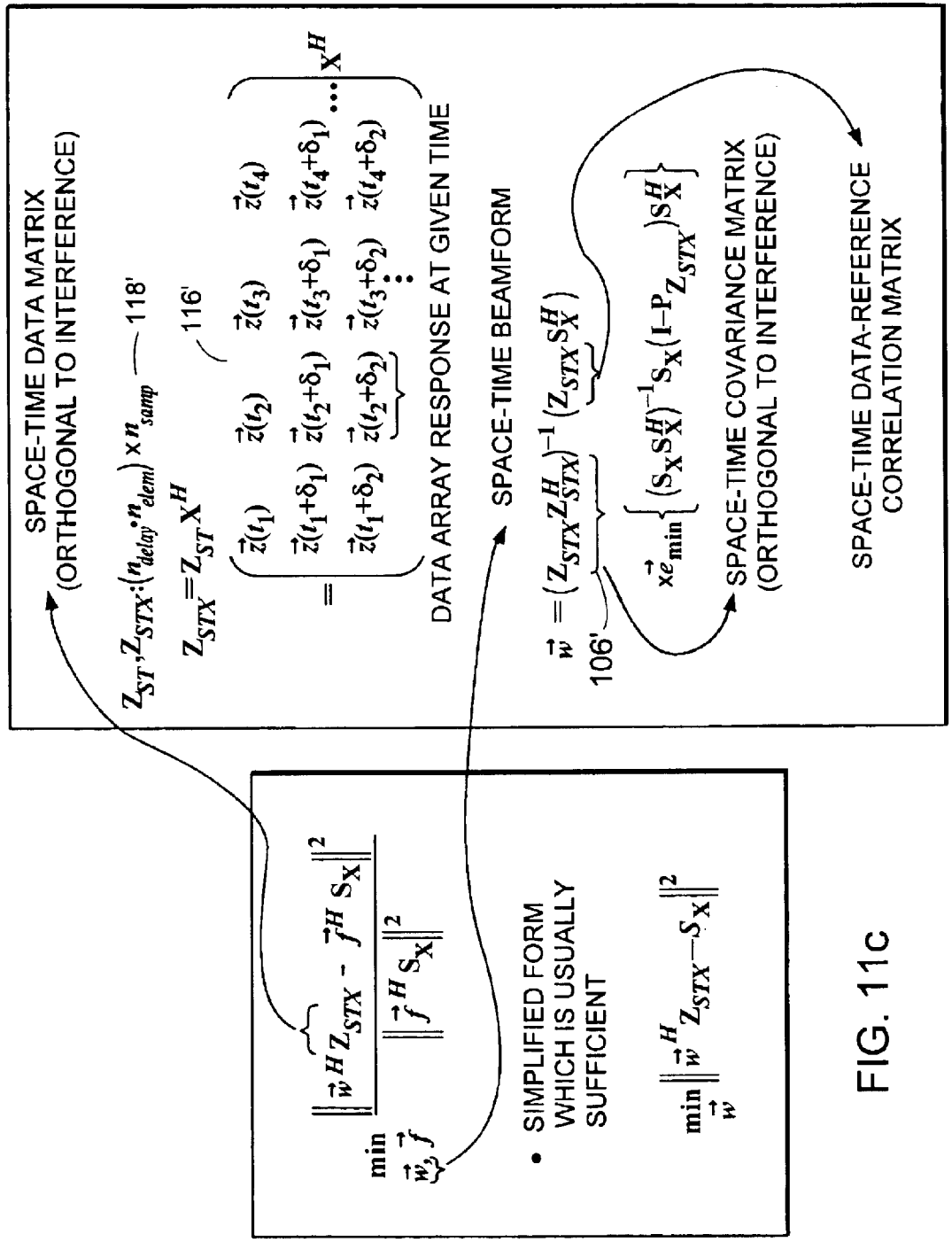

FIGS. 11*a*–11*c* show another particular embodiment involving minimum mean squared error computations. Referring to FIGS. 11*a*–11*c*, the baseband signals 72 are utilized by three operations. The reference interference correlation operation is described above with respect to FIG. 10*b*. A space-time data interference correlation operation 104 computes a space-time data interference correlation matrix 104':

$$Z_{ST} T_b^H$$

The space-time data-interference correlation matrix contains estimates of the similarity between the space-time data and the remodulated interference signals at various delays, and is utilized as shown in FIG. 11*b*.

A space-time data matrix 116' can be computed as.

$$Z_{ST}:(n_{delay} \cdot n_{elem}) \times n_{samp}$$

$$Z_{ST} = \begin{pmatrix} \vec{z}(t_1) & \vec{z}(t_2) & \vec{z}(t_3) & \vec{z}(t_4) \\ \vec{z}(t_1+\delta_1) & \vec{z}(t_2+\delta_1) & \vec{z}(t_3+\delta_1) & \vec{z}(t_4+\delta_1)\ldots \\ \vec{z}(t_1+\delta_2) & \vec{z}(t_2+\delta_2) & \vec{z}(t_3+\delta_2) & \vec{z}(t_4+\delta_2) \\ & & \vdots & \end{pmatrix}$$

The space-time data matrix contains the received data for all antennas and various delayed versions of this data.

$$z_{STX} = Z_{ST} X^H$$

The space-time data matrix orthogonal to the interference contains a form of the space-time data matrix projected onto a basis orthogonal to the estimated interference.

A space-time data covariance operation 106 computes a space-time data covariance matrix 106':

$$Z_{STX} Z_{STX}^H$$

The space-time data matrix covariance shown is orthogonal to interference and estimates the correlation between antenna-delay pairs for the received data projected on a basis orthogonal to the estimated interference, and is computed as shown in FIG. 11*c*.

The processing of the coding/symbol information 74 in the reference autocorrelation operation 82 occur similarly as in the maximum likelihood implementation. Further, processing of the coding/symbol information 74 is also performed by a space-time data reference correlation operation 108, which produces a space-time data-reference correlation matrix 108':

$$Z_{ST} S_a^H$$

which is used to compute a space-time data reference correlation matrix orthogonal to the interference 109':

$$Z_{STX} S_X^H$$

The space-time data-reference correlation matrix contains estimates of the similarity between a form of the space-time data matrix projected onto a basis orthogonal to the estimated interference and a form of the reference signal projected onto a basis orthogonal to the estimated interference.

The outputs 82' 84', 86', 104', 106' and 108' are used to calculate statistic 88, and processing continues as described above with respect to operations 88, 90, 96, and 98. This minimum mean squared error embodiment generally differs from the maximum likelihood embodiment in that data is replaced with space-time data. Referring to the block diagram of FIG. 9, this embodiment reverses the space time adaptive beamforming 60 along with the tapped delay lines 34*a*–*d* and the reduced dimension estimation subtraction 58 and accordingly, the operations do not map exactly to the components shown by the dotted lines 80*a*–80*d* in FIG. 10*b*.

Figure 12A:
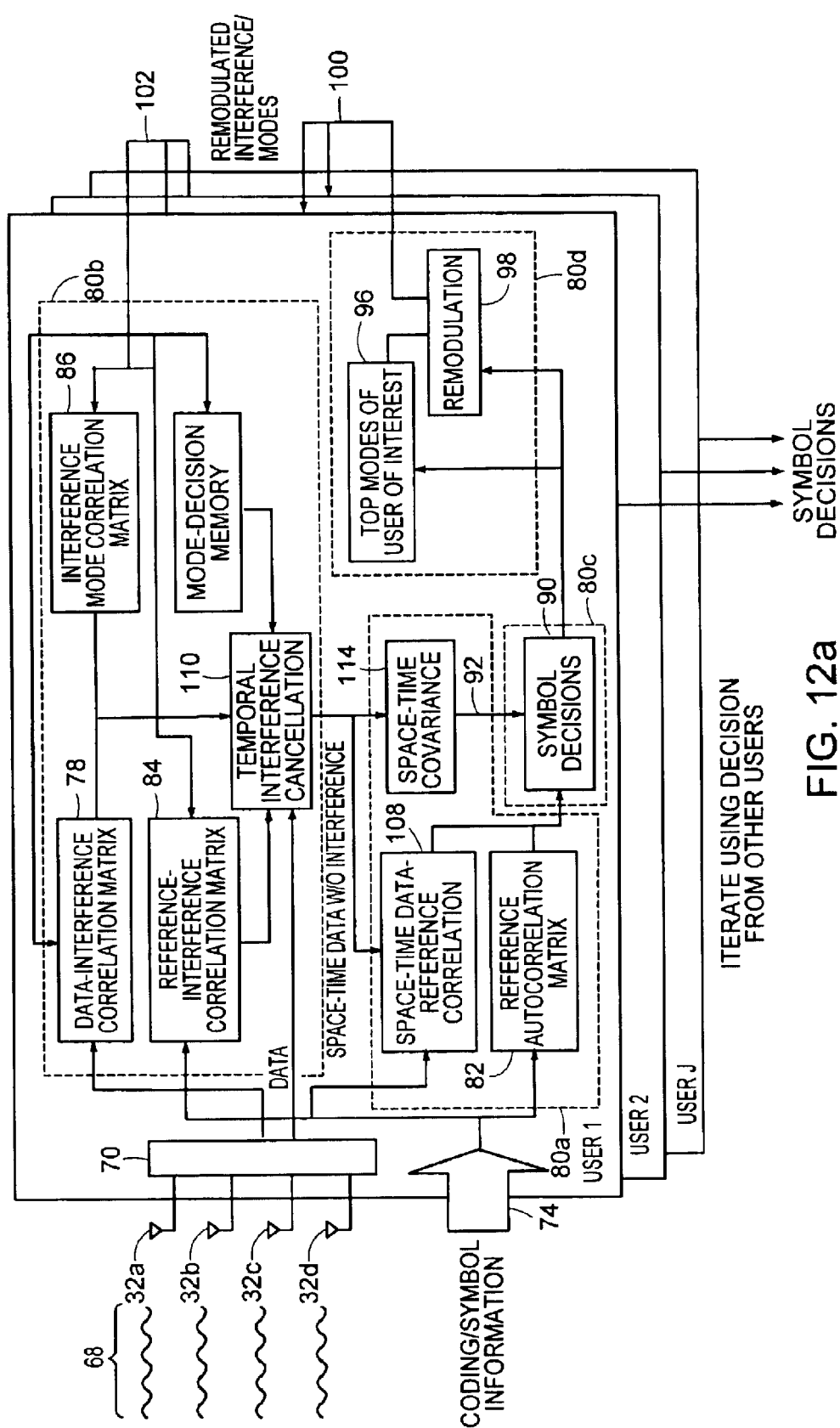
FIG. 12a shows a block dataflow diagram of an alternative embodiment of the minimum mean squared error embodiment of multichannel multiuser detection.
Figure 12B:
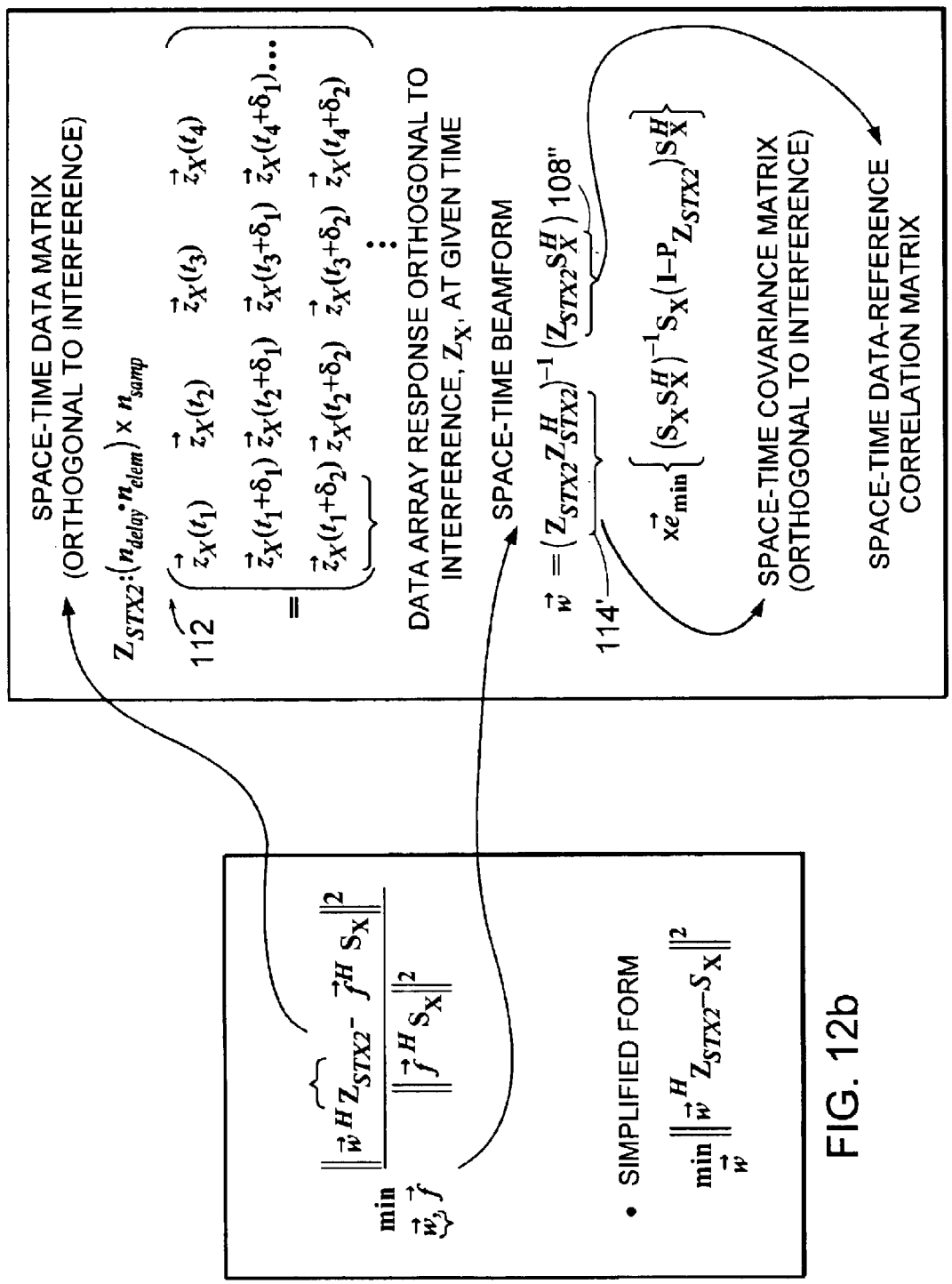

In another particular embodiment, shown in FIGS. 12*a*–12*b*, an alternate form of the minimum mean squared error computations are disclosed. Mapping of the operations to the block diagram of FIG. 9 is shown by the dotted lines 80*a*–80*d* as described above.

The data-interference correlation operation 78' computes a data interference correlation matrix 78' as described above with respect to FIG. 10*b*. The reference interference correlation 84 operation computes a reference interference correlation matrix 84' as in FIG. 10*b*.

The coding/symbol information 74 is processed as described above (FIG. 11a) by the reference autocorrelation operation 82, the space-time data reference correlation operation 108, and the reference interference correlation operation 84.

The outputs 78', 84', and 86' are sent to the temporal interference cancellation operation 110. The temporal interference cancellation operation 110 computes a temporal interference cancellation matrix (not shown):

$$Z_X = ZX^H$$

The temporal interference canceled form of the data is projected onto a basis orthogonal to the estimated temporal structure of the interference. The temporal interference cancellation matrix is used to compute an alternate form of the space-time data matrix 112'

$$Z_{STX2}:(n_{delay} \cdot n_{elem}) \times n_{samp} = \begin{pmatrix} \vec{z}_X(t_1) & \vec{z}_X(t_2) & \vec{z}_X(t_3) & \vec{z}_X(t_4) \\ \vec{z}_X(t_1+\delta_1) & \vec{z}_X(t_2+\delta_1) & \vec{z}_X(t_3+\delta_1) & \vec{z}_X(t_4+\delta_1)\ldots \\ \vec{z}_X(t_1+\delta_2) & \vec{z}_X(t_2+\delta_2) & \vec{z}_X(t_3+\delta_2) & \vec{z}_X(t_4+\delta_2) \\ & & \vdots & \end{pmatrix}$$

The space-time data matrix 112' (orthogonal to interference) contains temporal interference canceled data and various delayed versions of this sequence, and is computed as shown in FIG. 12b. The space time covariance operation then computes a space-time covariance matrix (orthogonal to interference) 114':

$$Z_{STX2} Z_{STX2}^H$$

The space-time covariance matrix 114' estimates the correlation between antenna-delay pairs for the received data projected on a basis orthogonal to the estimated interference.

The space time covariance matrix is sent to the symbol decision operation. The symbol decision operation computes a symbol decision using the space-time covariance matrix 114', the reference autocorrelation matrix 82', and an alternate form of the space-time data reference correlation 108':

$$Z_{STX2} S_X^H$$

The space-time data-reference correlation matrix 108" (alternate form) contains estimates of the similarity between a form of the space-time data matrix projected onto a basis orthogonal to the estimated interference and a form of the reference signal projected onto a basis orthogonal to the estimated interference.

The symbol decisions operation 90 selects symbols which have converged sufficiently, and the top modes of user of interest operation 96 and the remodulation operation 98 continue as described above.

The operations described herein occur in a plurality of instantiations, each corresponding to a particular user. Further, for a signal corresponding to a particular symbol, multiple iterations may be performed until the computations converge. These operations may occur in a parallel processing environment concurrently computing each instantiation, and may partition address space by a variety of methods. Alternatively, these operations can be performed in a sequential manner, completing one or more iterations for an instantiation, storing the results, and switching context to another user in a cyclic manner until all instantiations have been processed. The system and methods as discussed herein can be implemented by various techniques without departing from the invention as defined by the present claims.

Those skilled in the art should readily appreciate that the programs defining the operations and methods defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While the system and method for multi-channel multi-user detection have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of multichannel multiuser detection in a wireless communication system comprising:
   evaluating signals from plural antennas to tapped delay lines;
   for each of at least one users, dependent on a set of user spreading codes, adjusting coefficients to a delay line and processing the delay line and antenna outputs to estimate a symbol based on an estimated space-time correlation between antenna space and delay time; and
   remodulating the estimated symbol and applying the remodulated symbol to the antenna signals corresponding to other users of the wireless communication system.

2. The method of claim 1 further comprising a sequence of the spreading codes used to construct a particular space-time response for all possible symbols.

3. The method of claim 1 wherein each of the spreading codes is indicative of a particular user.

4. The method of claim 1 further comprising receiving a plurality of delays in the delay line.

5. The method of claim 4 further wherein each of the delays corresponds to receiving a wireless transmission at an antenna.

6. The method of claim 5 wherein the wireless transmissions have a range of received power.

7. The method of claim 6 wherein the range of received power is sufficient to increase the convergence of the estimating.

8. The method of claim 4 wherein the delays are indicative of a vector quantity corresponding to a space-time array response.

9. The method of claim 8 wherein the spreading code and the estimated symbol is indicative of the space-time array response.

10. The method of claim 4 wherein the delays are received by a base station processor via a reverse link of the wireless communication system.

11. The method of claim 1 wherein the estimated symbol corresponds to a particular user of interest.

12. The method of claim 1 wherein the received signal from other users comprises noise.

13. The method of claim 1 wherein a plurality of the spreading codes and a plurality of the antennas correspond to a particular user.

14. The method of claim 1 wherein the wireless communication system is a multiple input-multiple output (MIMO) system.

15. A wireless communication system operable for multichannel multiuser detection comprising:
- a plurality of antennas each operable to receive a wireless signal;
- tapped delay lines adapted to receive the wireless signals, wherein the wireless signals correspond to a set of user spreading codes;
- a space-time correlator operable to adjust coefficients to the received wireless signals and process delay line outputs corresponding to the plurality of wireless signals to estimate a symbol based on an estimated space-time array response for an antenna space and delay time correlation; and
- a remodulator operable to remodulate the estimated symbol using the estimated space-time array response and subtract it from the received antenna signals of other users.

16. The system of claim 15 wherein the space-time correlator is further operable to construct a particular space-time response using the spreading sequence for all possible symbols.

17. The system of claim 15 further comprising receiving the plurality of delays at the delay line.

18. The system of claim 17 wherein each space-time array response corresponds to a wireless transmission.

19. The system of claim 18 wherein the wireless transmissions correspond to a range of received power.

20. The system of claim 19 wherein the range of received power is sufficient to increase convergence of the multichannel multiuser detector.

21. The system of claim 18 wherein the wireless communications are received via a reverse link.

22. The system of claim 17 wherein the delays are indicative of a vector quantity corresponding to a space-time array response.

23. The system of claim 22 wherein the space-time array response is indicative of the spreading code and the estimated symbol.

24. The system of claim 15 wherein each of the spreading codes corresponds to a particular user.

25. The system of claim 15 wherein the estimated symbol corresponds to a user of interest.

26. The system of claim 15 wherein a plurality of the spreading codes and a plurality of the antennas correspond to a particular user.

27. The system of claim 15 wherein the wireless communication system is a multiple input-multiple output (MIMO) system.

28. The system of claim 15 further comprising repeating the adjusting and processing step.

29. The system of claim 15 further comprising a decision evaluator operable to evaluate the estimated symbol against a predetermined symbol decision criterion, and further operable to iterate through the adjusting, processing, and remodulating until the estimated symbol corresponds to the predetermined symbol decision criteria.

30. A computer program product having computer program code for multichannel multiuser detection in a wireless communication system comprising:
- computer program code for evaluating signals from plural antennas to a tapped delay line;
- computer program code for adjusting coefficients to a delay line for each of a plurality of users, the users dependent on a set of user spreading codes, and processing the delay line and antenna outputs to estimate a symbol based on an estimated space-time correlation between antenna space and delay time; and
- computer program code for remodulating the estimated symbol and applying the remodulated symbol to the antenna signals corresponding to other users of the wireless communication system.

31. A computer data signal on a computer readable medium for multichannel multiuser detection in a wireless communication system comprising:
- program code for evaluating signals from plural antennas to a tapped delay line;
- program code for adjusting coefficients to a delay line for each of a plurality of users, the users dependent on a set of user spreading codes, and processing the delay line and antenna outputs to estimate a symbol based on an estimated space-time correlation between antenna space and delay time; and
- program code for remodulating the estimated symbol and applying the remodulated symbol to the antenna signals corresponding to other users of the wireless communication system.

32. A wireless communication system operable for multichannel multiuser detection comprising:
- means for evaluating signals from plural antennas to a tapped delay line;
- means for adjusting coefficients to a delay line for each of a plurality of users, the users dependent on a set of user spreading codes, and processing the delay line and antenna outputs to estimate a symbol based on an estimated space-time correlation between antenna space and delay time; and
- means for remodulating the estimated symbol and applying the remodulated symbol to the antenna signals corresponding to other users of the wireless communication system.

* * * * *